United States Patent [19]

Liao

[11] Patent Number: 5,470,168

[45] Date of Patent: Nov. 28, 1995

[54] DEVICE FOR SPEEDILY MOUNTING OBJECTS ON TUBES AND BARS

[75] Inventor: Gordon Liao, Taipei, Taiwan

[73] Assignee: Union Sports Co., Ltd., Taipei, Taiwan

[21] Appl. No.: 80,887

[22] Filed: Jun. 22, 1993

[51] Int. Cl.⁶ .................................................... B25G 3/20
[52] U.S. Cl. ........................ 403/368; 403/374; 403/386; 403/399
[58] Field of Search .................................. 403/314, 368, 403/374, 386, 399

[56] References Cited

U.S. PATENT DOCUMENTS

| | | | |
|---|---|---|---|
| 936,195 | 10/1909 | Umpleby | 403/314 |
| 2,835,949 | 5/1958 | Wengen et al. | 403/368 |
| 4,040,754 | 8/1977 | Burroughs | 403/374 |
| 4,100,749 | 7/1978 | Radner et al. | 403/374 |
| 4,105,262 | 8/1978 | Richey | 403/374 |
| 4,906,127 | 3/1990 | Nixon et al. | 403/399 |
| 5,050,820 | 9/1991 | Anderson | 403/374 |
| 5,141,356 | 8/1992 | Chaize | 403/374 |

FOREIGN PATENT DOCUMENTS

| | | | |
|---|---|---|---|
| 8001530 | 10/1981 | Netherlands | 403/399 |
| 8201458 | 11/1983 | Netherlands | 403/374 |

Primary Examiner—Timothy S. Thorpe
Assistant Examiner—Howard R. Richman
Attorney, Agent, or Firm—Pro-Techtor International

[57] ABSTRACT

A speedy fixing device for tubes and bars of various shapes and sizes, having two elongate upright parallel teeth plates and an engaging base. The teeth plates are fixed firmly on an object which is to be affixed to the tube or bar, and have a plurality of longitudinal teeth in two vertical parallel slots of the engaging base. The engaging base has an inverted V-shaped bottom surface to contact an upper surface of a tube or a bar. The engaging base slides inward gradually to compress tightly the tube or the bar placed under the base and between the two plates. An elastic cushion is used to inhibit slipping.

3 Claims, 11 Drawing Sheets

DEVICE FOR SPEEDILY MOUNTING OBJECTS ON TUBES AND BARS

BACKGROUND OF THE INVENTION

Figure 1:
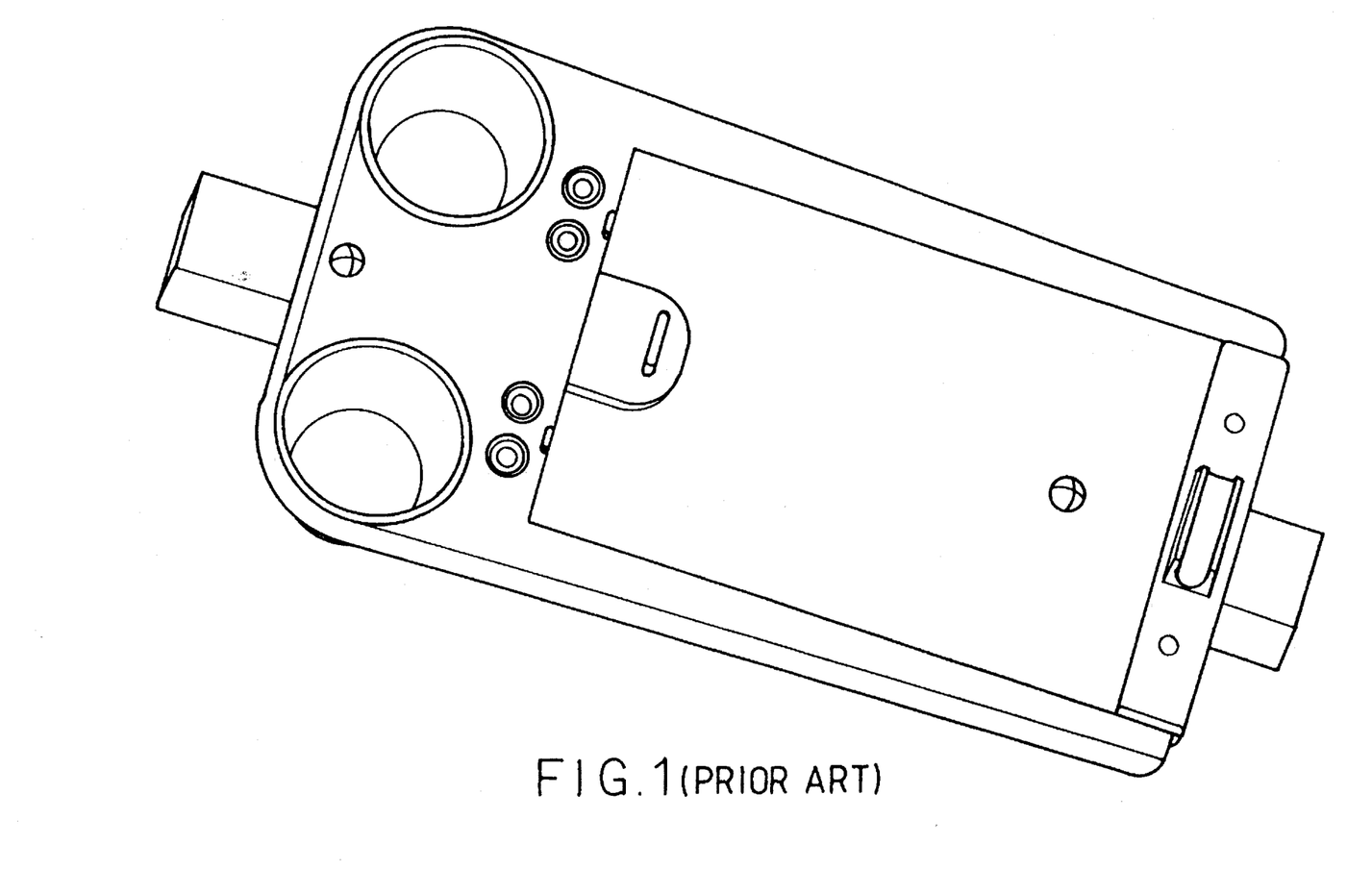
FIG. 1 is a perspective view of a first conventional fixing device for tubes and bars.
Figure 2:
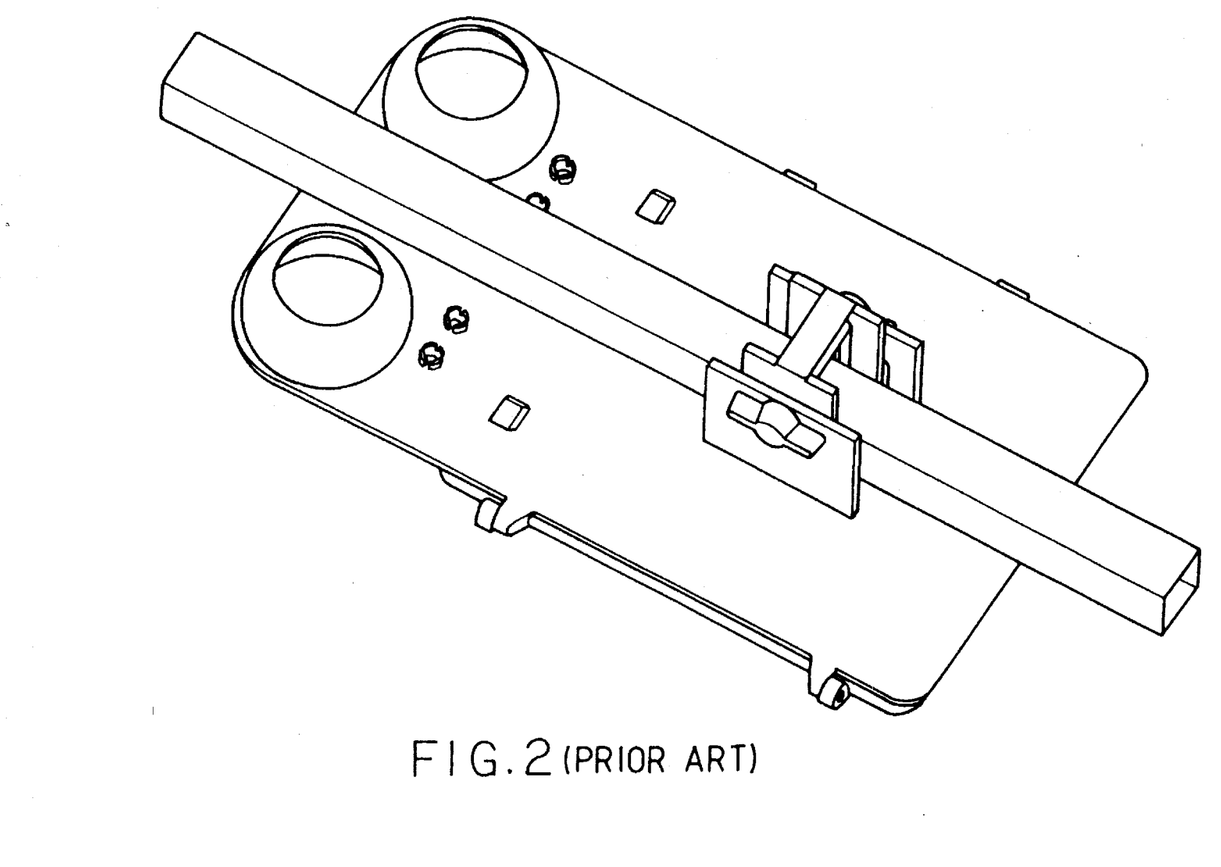
FIG. 2 is a perspective view of a second conventional fixing device for tubes and bars.
Figure 3:
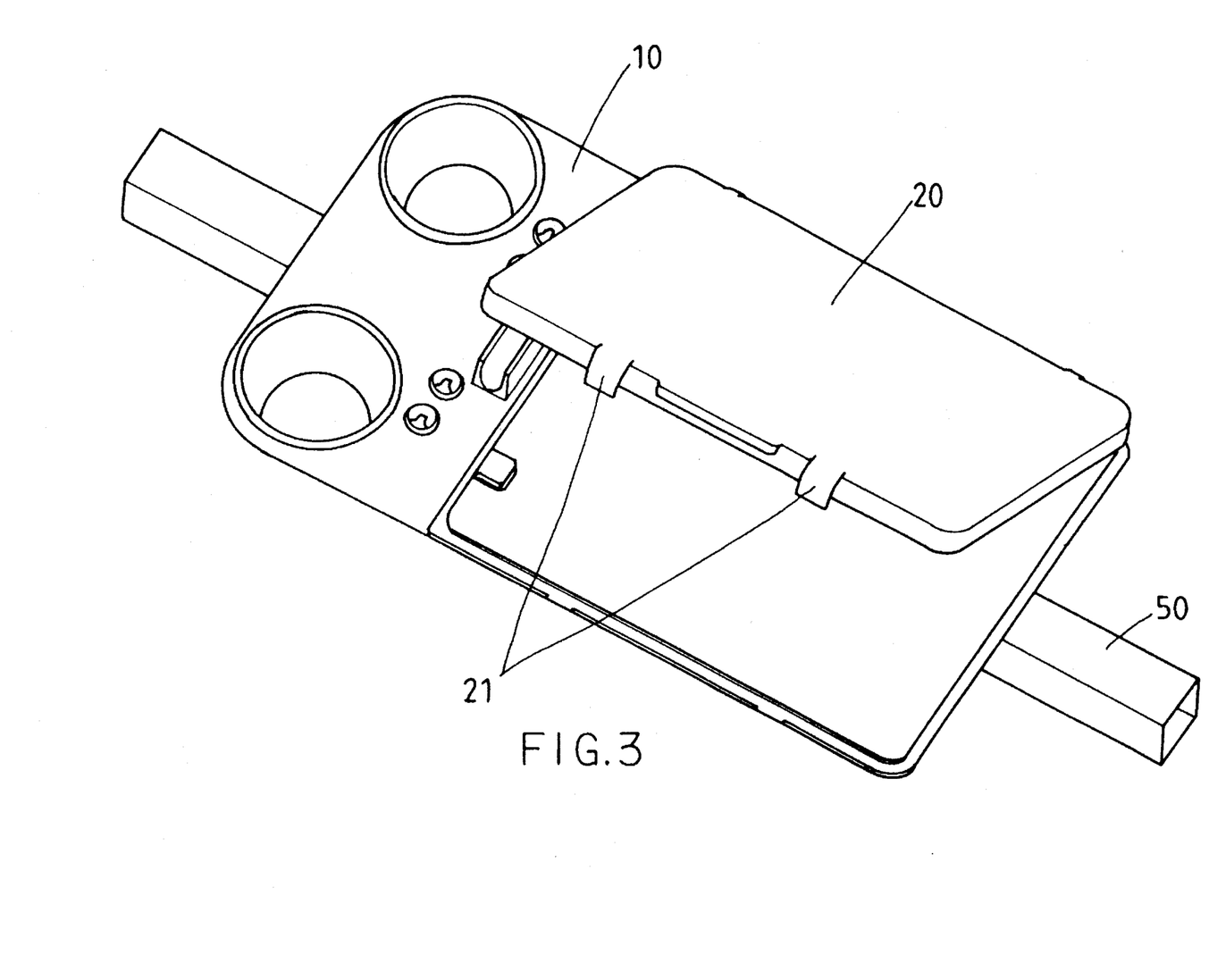
FIG. 3 is a perspective view of a first embodiment of a speedy fixing device for tubes and bars in the present invention.
Figure 4:
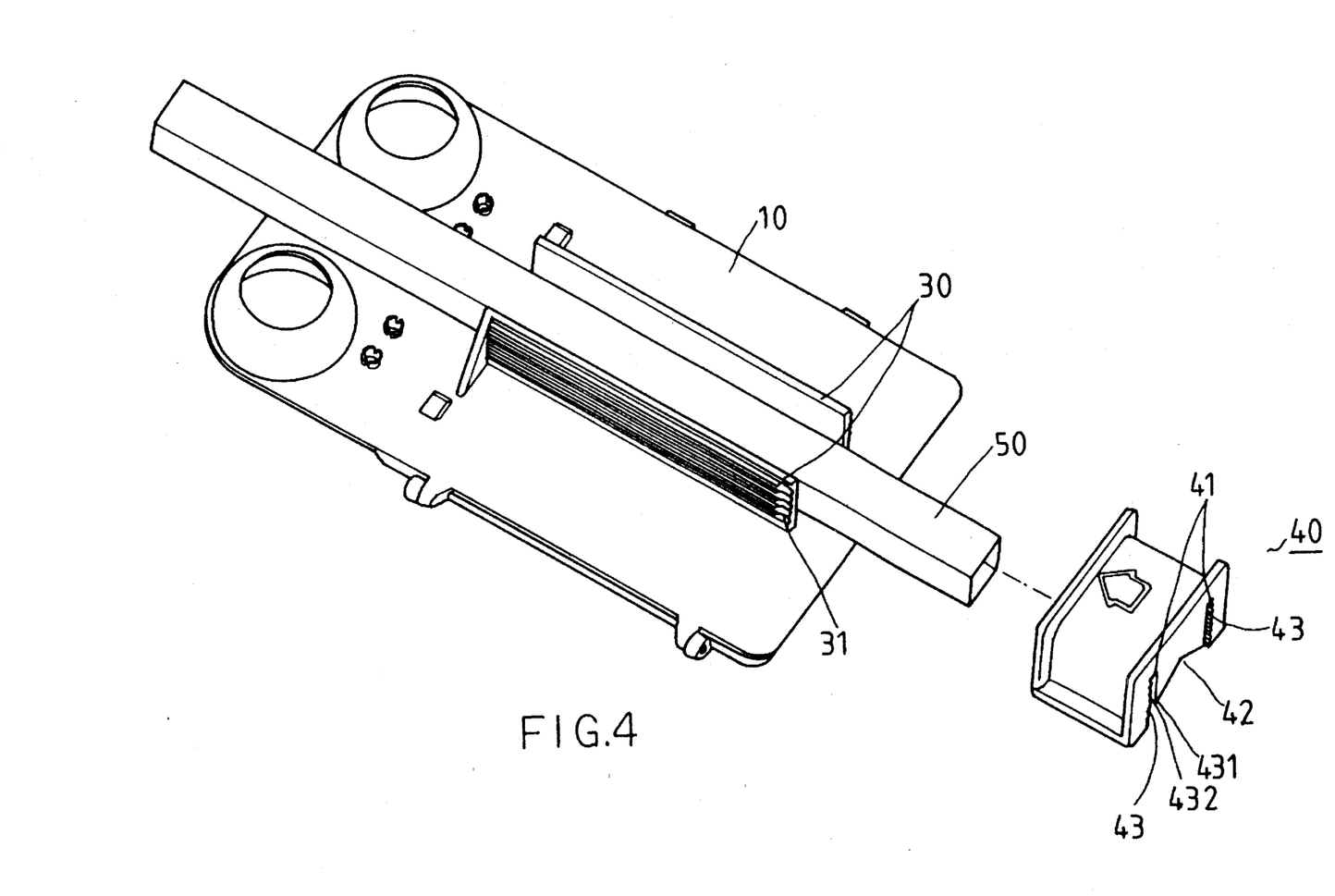
FIG. 4 is an exploded perspective view of the rear side of the first embodiment of the speedy fixing device for tubes and bars in the present invention.
Figure 5:
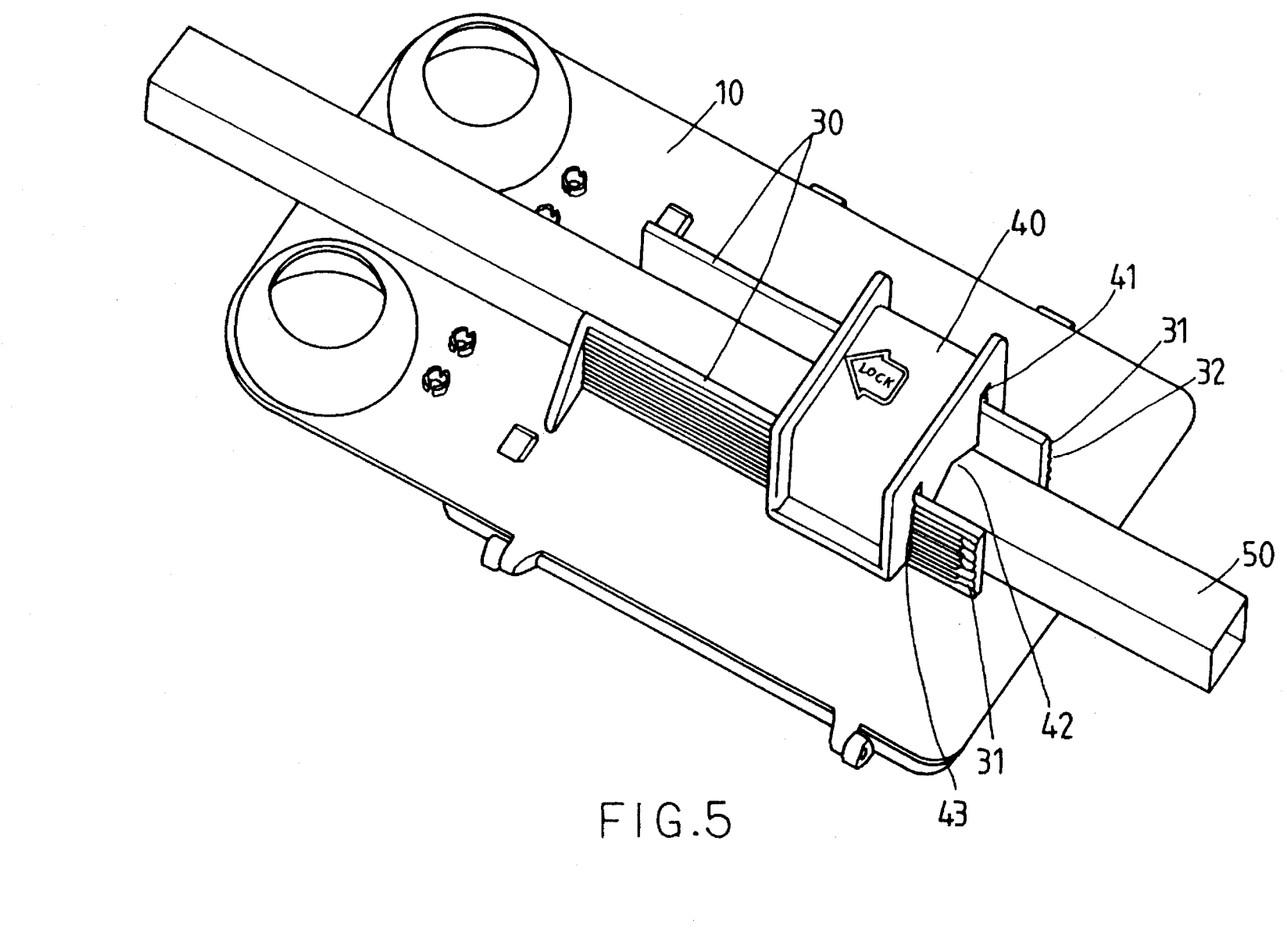
FIG. 5 is a combined perspective view of the rear side of the first embodiment of the speedy fixing device for tubes and bars in the present invention.

A conventional mounting device for tubes and bars is generally mounted on an object fixed in place. The device is applied by means of holes bored in a tube or bar and the object and fixed with a screw as shown in FIG. 1. Or, as shown in FIG. 2, two upright parallel plates are fixed on the object, and a bolt is provided to laterally pass through a hole in each parallel plate for tightening or loosening the two parallel plates and then keeping the tube or the bar secured between the two plates, tightly or loosely.

Basically, the task of boring holes in an object and corresponding holes in a tube or bar is very difficult, and should be done in an industrial setting. A consumer can hardly manage it.

Though the fixing method utilizing two upright parallel plates and a bolt for tightening or loosening a tube or a bar can be applied to some different shapes and sizes, it cannot satisfy its purpose for a large scope of sizes and shapes. Rotating the bolt in tightening and loosening the device does not allow speedy fixing.

SUMMARY OF THE INVENTION

This invention has been devised to offer a speedy fixing device for tubes and bars of any shape and of a wide scope of sizes with the following features.

1. It can be applied to objects of various shapes and sizes.

2. It can allow a tube or a bar to be fixed speedily;

3. A producing factory can lower the cost for molds, increasing competitiveness.

4. A consumer can apply it to various objects without using tools.

2

DETAILED DESCRIPTION OF THE INVENTION

A speedy fixing device for tubes and bars in the present invention, as shown in FIGS. 3–7, is applied to a score board 10 adapted for use on a golf cart, and comprises a transparent upper cap 20 with two hooks 21, 21 on one longitudinal side, the other longitudinal side of the upper cap 20 being pivotally connected to the score board 10. Two teeth plates 30, 30 are fixed upright in parallel on a rear surface of the score board 10, with an engaging base 40 to engage with teeth plates 30, 30. This enables the score board 10 to be affixed to an object 50 of various shape and size. An elongate elastic cushion 60 is fixed between the two plates 30, 30 on the rear surface of the score board 10, to inhibit the score board 10 from sliding or moving on the object 50.

Each teeth plate 30 has a plurality of longitudinal parallel teeth on an outer surface. Each tooth 31 has a cross-section to slope from inside to outside, and a tooth groove 32 is defined by each part of two adjacent teeth 31, 31.

The engaging base 40 has two upright parallel slots 41, 41 opening to the bottom to fit with the two teeth plates 30, 30. The base 40 has an inverted V-shaped bottom surface 42 between the two slots 41, 41 and a plurality of longitudinal teeth 43 in an outer surface of each slot 41. Each tooth 43 has the same cross-section as the teeth 31, and longitudinal grooves 44 are defined by each pair of two adjacent teeth 43, 43. The two groups of teeth 43 engage the two groups of the teeth 31 of the teeth plates 30, 30 enabling the engaging base 40 to slide along on the two teeth plates 30, 30.

Each teeth plate 30 has a wedge-shaped guide face 311 at a right end. The engaging base 40 also has a wedge-shaped guide face 431 at a left end of a each group of teeth 43, and the guide face 311 and the guide face 431 correspond to each other.

Figure 8:
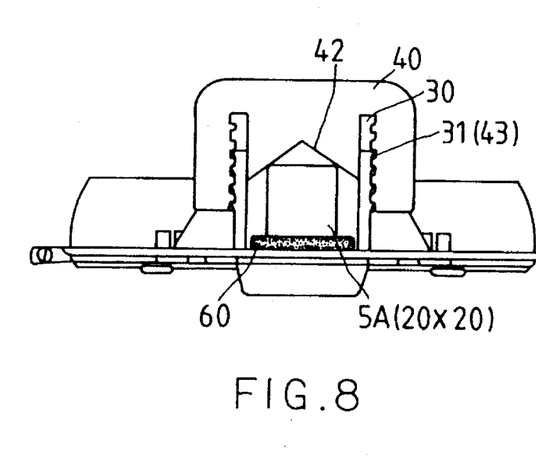
FIG. 8 is a front view of the first embodiment of the speedy fixing device with a square tube, size 20×20 mm, fixed thereon in the present invention.
Figure 9:
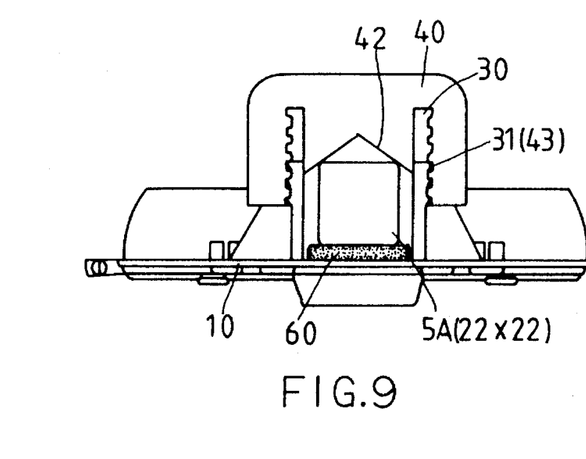
FIG. 9 is another view of the first embodiment of the speedy fixing device with a square tube, size 22×22 mm, fixed thereon in the present invention.
Figure 10:
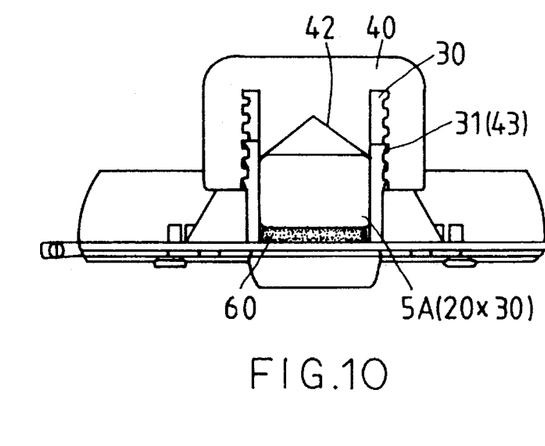
FIG. 10 is another front view of the first embodiment of the speedy fixing device with a square tube, size 20×30 mm, fixed thereon in the present invention.

In assembling, the score board 10 is combined with the object 50 of various shapes and sizes, for example, a square bar 5A (FIGS. 8–10) and a round tube 5B (FIGS. 11–13) preferably. How to combine them is to be described with reference to FIGS. 8–13.

Figure 6:
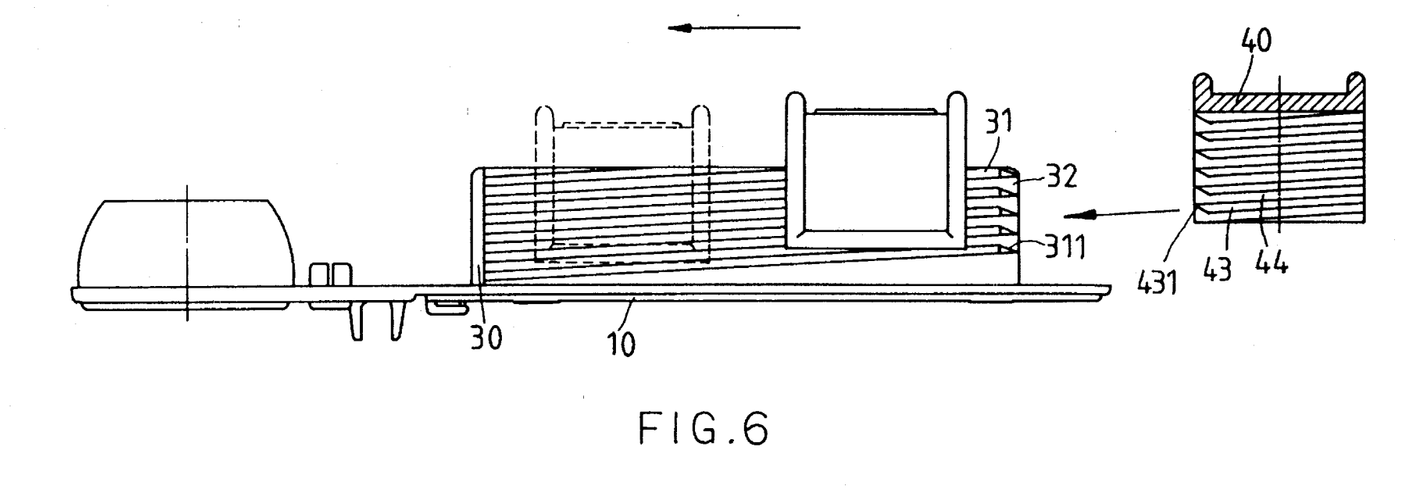
FIG. 6 is a side view of the first embodiment of the speedy fixing device for tubes and bars in the present invention.
Figure 7:
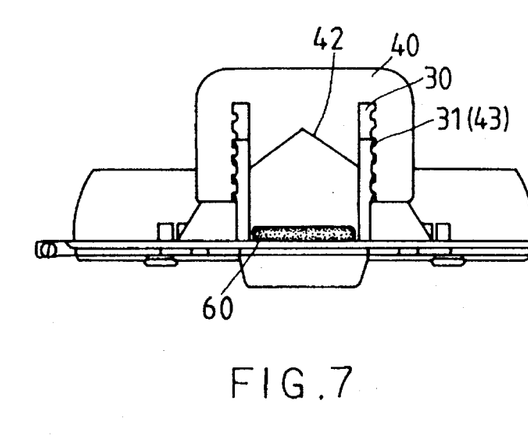
FIG. 7 is a front view of the first embodiment of the speedy fixing device in the present invention.

1. When the score board 10 is to be combined with the square bar 5A as a mounting element, the square bar 5A is to be placed between the two teeth plates 30, 30 on the elastic cushion 60. Then the inverted V-shaped surface 42 of the engaging base 40 is made to contact an upper surface of the square bar 5A. The engaging base 40 is then pushed to move to the left, first guided by the wedge-shaped surfaces 431 and 311 as shown in FIG. 6 and then by engagement of the teeth 43 and teeth grooves 32 of the teeth plates 30, 30. As the engaging base 40 is gradually moved to the left, the inverted V-shaped surface 42 contact an upper surface of the bar 5A. As the base 40 continues to move to the left, the square bar 5A compresses the elastic cushion 60, which functions to inhibit sliding and to tighten score board 10 against square bar 5A securely. Whether the size of the square bar might be 20×20, 22×22, or 20×30, they are all secured in the same manner.

Figure 11:
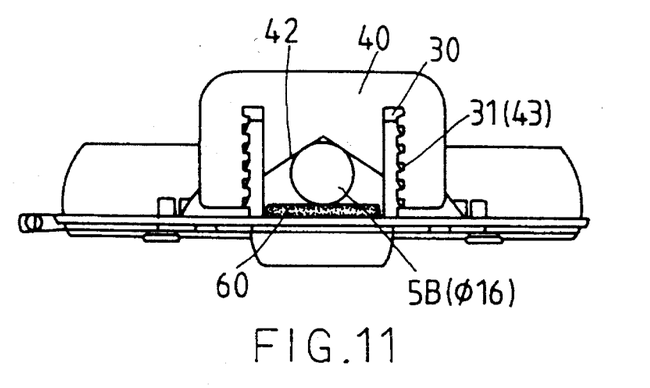
FIG. 11 is a front view of the first embodiment of the speedy fixing device with a round tube, size 16 mm, fixed thereon in the present invention.
Figure 12:
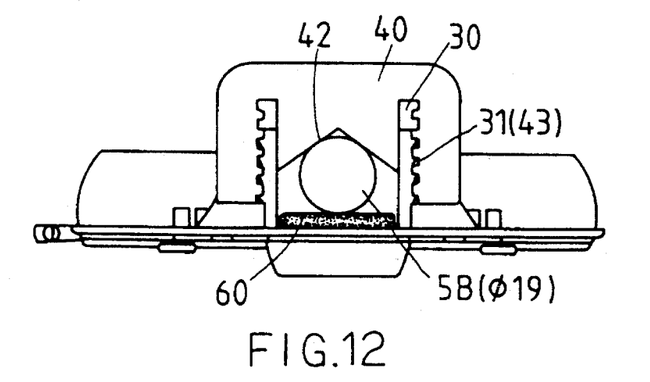
FIG. 12 is another front view of the first embodiment of the speedy fixing device with a round tube, size 19 mm, fixed thereon in the present invention.
Figure 13:
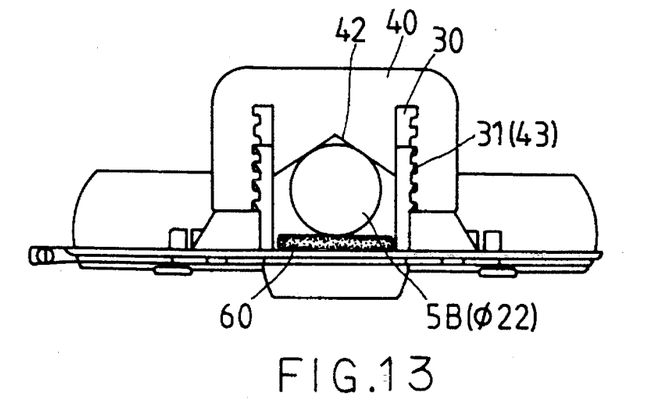
FIG. 13 is another front view of the first embodiment of the speedy fixing device with a round tube, size 22 mm, fixed thereon in the present invention.

2. When the score board 10 is to be combined with the round tube 5B as a mounting element, operation can be the same as that of the square bar 5A. The inverted V-shaped surface 42 is to be made to contact the outer surface of the round tube 5B and the engaging base 40 is moved to the left, first letting the teeth 43 engage the teeth 31 and then gradually pushed to let the inverted V-shaped surface 42 increasingly compress the round tube 5B down on the elastic cushion 60. The clamping action securely fixes the score board 10 to the tube 5B whether the size of the round tube 5B is 16, 19, or 22 mm, as shown in FIGS. 11–13.

In short, the main feature in the present invention is provision of the longitudinal teeth 31 of the teeth plates 30, 30 and the teeth 43 of the engaging base 40. Different numbers of teeth engaging each other and different location of them can be useful in adjusting the distance between the inverted V-shaped surface 42 of the engaging base 40 and the elastic cushion 60 so that tubes or bars of different shapes and sizes can be tightly secured or loosened on this device.

Figure 14:
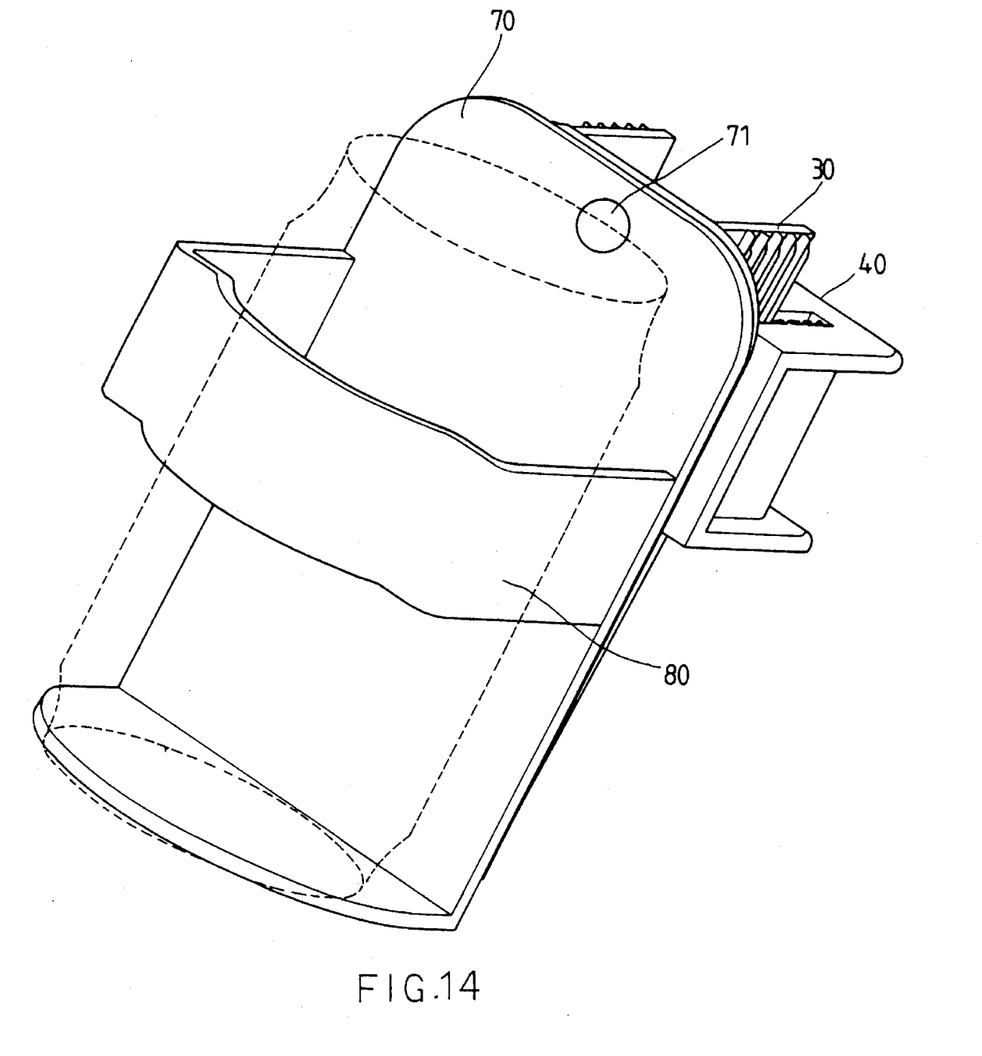
FIG. 14 is a perspective view of a second embodiment of the speedy fixing device in the present invention.
Figure 15:
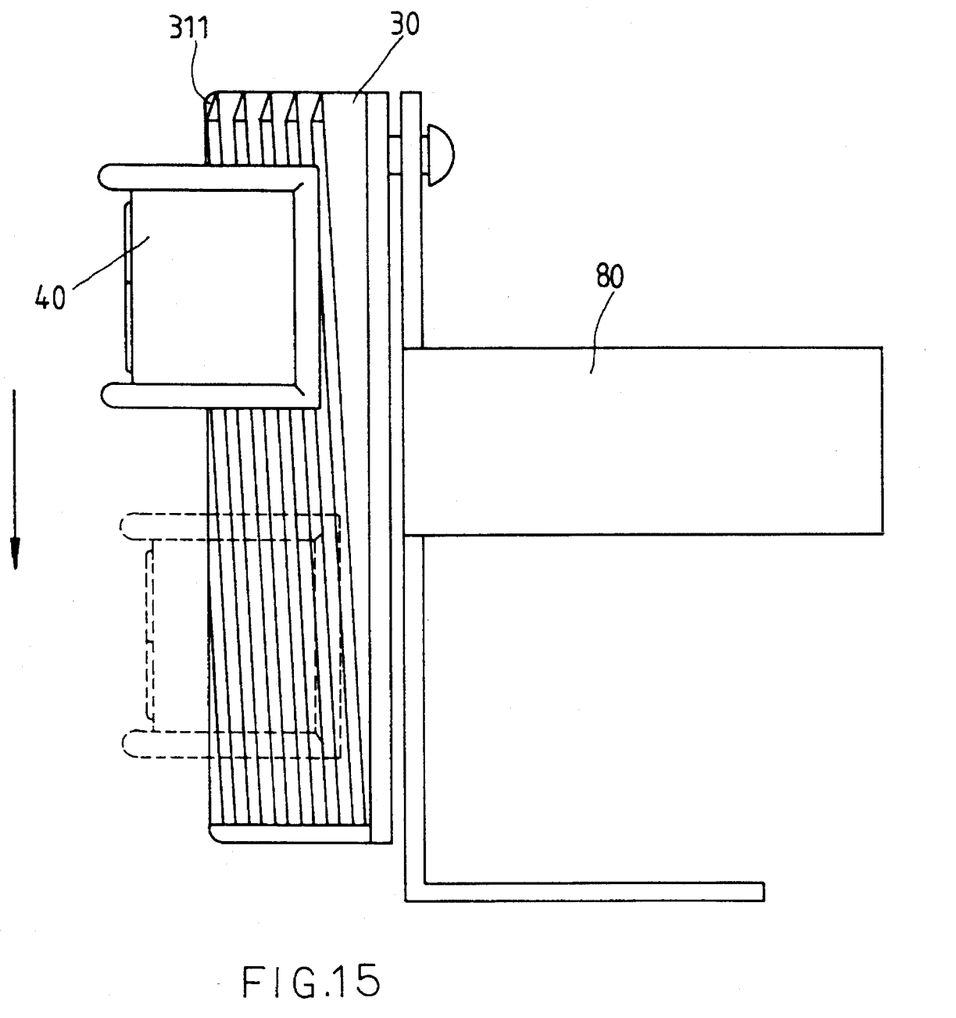
FIG. 15 is a cross-sectional view of the second embodiment of the speedy fixing device in the present invention.
Figure 16:
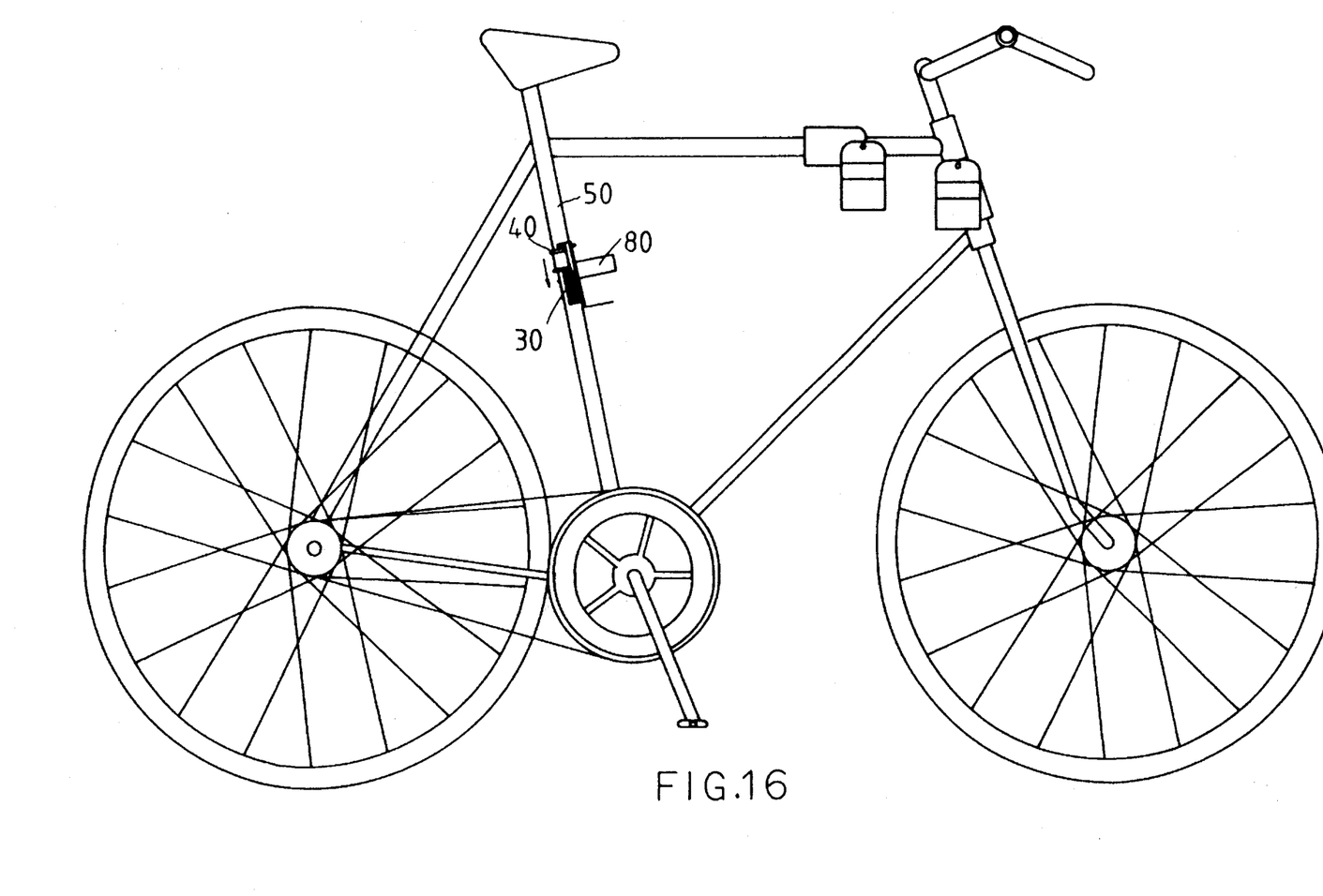
FIG. 16 is a perspective view of the second embodiment of the speedy fixing device mounted on a bicycle in the present invention.

A second embodiment of the present invention, as shown in FIGS. 14–16, is applied to a drinking vessel holder mounted on a bicycle.

The second embodiment comprises two teeth plates 30, 30 fixed firmly upright in a parallel on a flat plate 70, a drinking vessel holder 80, fixed together with the flat plate 70 with a rivet fitting through a rivet hole 71. Even if a tubular rod 50 is not vertical to the ground, the gravity of the drinking vessel holder 80 can keep the holder 80 horizontal on a rotating surface of the teeth plates 39, 30. This device with the holder 80 can be used for placing a canned drink or paper cups thereon. A user can fix this device combined with a drinking vessel holder on a proper place on a bicycle, without using any tools.

I claim:

1. A device for mounting objects on tubes and bars comprising:

two elongate teeth plates being fixed upright and parallel to each other on an object, each elongate teeth plate having a plurality of longitudinal parallel teeth grooves defined by pairs of two adjacent teeth on an outer side of the teeth plate, the plurality of teeth grooves gradually sloping upward from a left end of the plates to a right end thereof, an elongate elastic cushion placed between the two teeth plates on said object to contact the tubes and bars, an engaging base having two parallel vertical slots, each opening to a bottom of the base so that the slots are adapted to receive said two elongate teeth plates, an inverted V-shaped bottom surface between the two slots, each slot having a plurality of parallel longitudinal teeth and teeth grooves defined by pairs of two adjacent teeth on an outer surface of said slot, the teeth gradually sloping in the same direction as the teeth on the teeth plates; wherein said teeth of the teeth plates engage the teeth of the engaging base so that the distance between the inverted V-shaped bottom surface of said engaging base and said object is reduced by moving said engaging base gradually toward the left end of said two teeth plates, thereby compressing said elastic cushion and fixing said tube and bars in place between said object and said engaging base.

2. The fixing device as claimed in claim 1, wherein:

said elastic cushion is made of rubber.

3. The fixing device as claimed in claim 1, wherein:

the teeth of said two teeth plates have wedge-shaped guide faces on right ends thereof, and the teeth of the engaging base.

* * * * *